A. B. STICKNEY.
ROAD-WAGON.

No. 178,809. Patented June 13, 1876.

WITNESSES
Robert Evoutt
E. H. Bates

INVENTOR,
Alpheus B. Stickney.
Chipman Hosmer &co
ATTORNEYS.

N. PETERS, PHOTO-LITHOGRAPHER, WASHINGTON, D. C.

UNITED STATES PATENT OFFICE.

ALPHEUS B. STICKNEY, OF ST. PAUL, MINNESOTA.

IMPROVEMENT IN ROAD-WAGONS.

Specification forming part of Letters Patent No. 178,809, dated June 13, 1876; application filed January 8, 1876.

*To all whom it may concern:*

Be it known that I, ALPHEUS B. STICKNEY, of St. Paul, in the county of Ramsey and State of Minnesota, have invented a new and valuable Improvement in Road - Wagons; and I do hereby declare that the following is a full, clear, and exact description of the construction and operation of the same, reference being had to the annexed drawings, making a part of this specification, and to the letters and figures of reference marked thereon.

Figure 1:
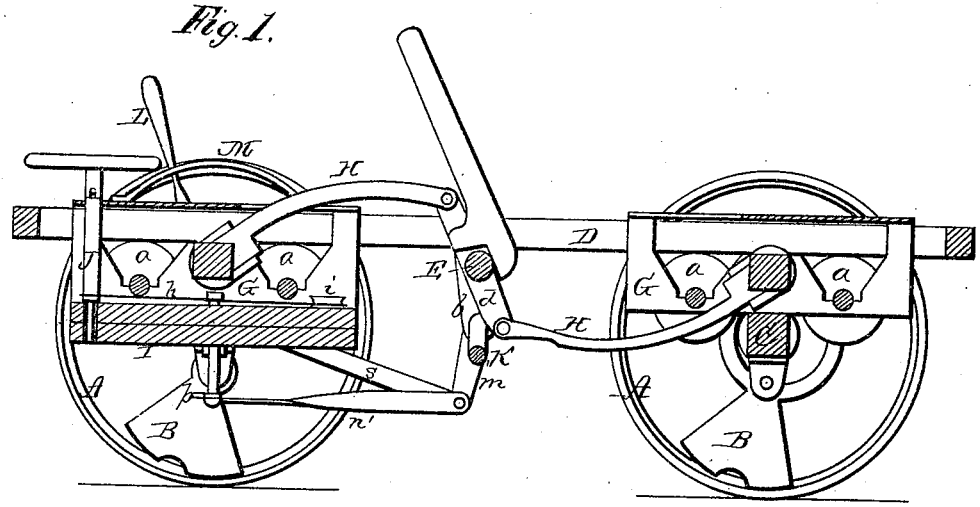
Figure 2:
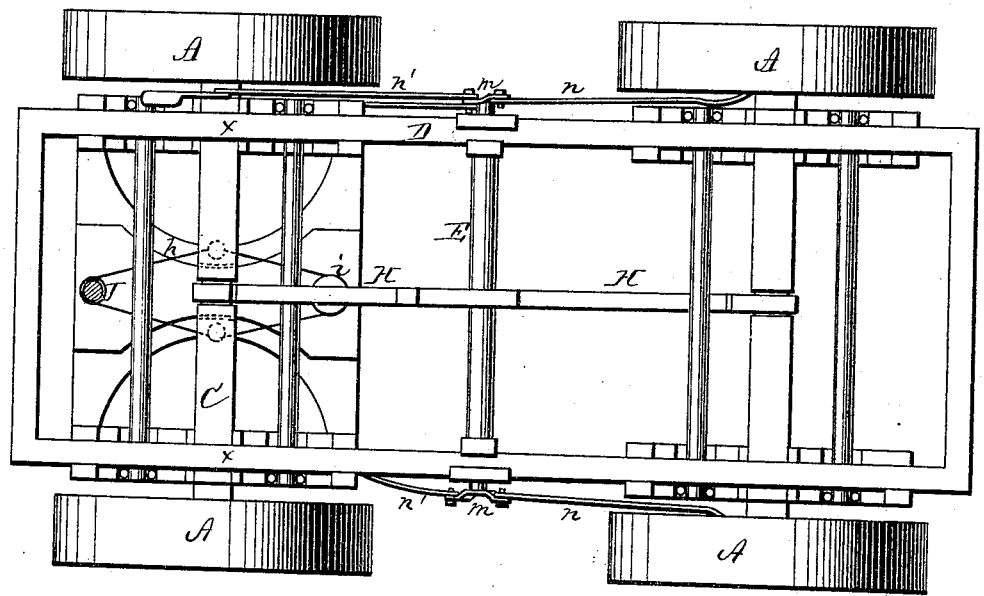

Figure 1 of the drawings is a representation of a longitudinal vertical section of my road-wagon, and Fig. 2 is a plan view thereof.

My invention relates to traction-engines or road-wagons, propelled by steam or other motive power, transported on or with the machine; and it consists in a novel method and means for propelling, reversing, and steering such wagons, as will be hereinafter more fully set forth.

My machine rests upon four wheels, A A, which revolve upon axles in the same manner that wheels of ordinary road - wagons now in common use revolve. These wheels may be fixed to their axles; but I prefer them to turn thereon, as it presents less friction, especially while the machine is running on a curved line.

These wheels may be made in any manner which will give sufficient strength to support the weight required; and they are formed with a broad rim, leaving a wide smooth surface on the inside of the rim, on which a friction-clutch or dog, B, may rest without interfering with the spokes of the wheel. This dog is made in the form of a segment, and is pivoted to a projection from the under part of the axle C.

When the wheel is to be allowed to revolve freely in one direction, the clutch is made to bear firmly against the rim on one side of a perpendicular let fall from the center of the axles, and when the wheel is to be allowed to revolve freely in an opposite direction the clutch or dog B is turned, so as to bear firmly on the rim on the opposite side of the said perpendicular. It is by this change or movement of the clutch or dog that the motion of the machine is reversed, and not, as is usually the case, by a reverse motion of the engine.

The movement and position of the clutch or dog are produced by means as will be hereinafter described.

D is the main frame of the machine, which may be made of any material of sufficient strength to support the boiler, engine, and other load which it may be desirable to carry on the machine. To this frame must be attached the engine, or whatever power may be used to propel the machine, in such a manner as not to interfere with the motion of the carriages G G and center shaft E.

One of the peculiarities of my invention is that I do not, as is usual, attach this frame or bed D firmly to the axles C C, and produce locomotion by revolving the wheels; but, on the contrary, I set this frame loosely on the axles, and produce locomotion by sliding the axles back and forth under the frame.

The carriages G are made of cast-iron, four in number, and rest on the axles C C of the main wheels A A, to which they are made fast. Each of these carriages supports two friction-wheels, *a a*, and upon these friction-wheels the main frame D rests, in such a manner that it can be made to move in either direction while the main wheels are at rest.

The frame D is kept in position on the friction-wheels *a* either by projections on the carriages, up each side of the frame, or by casting flanges on the friction-wheels, like the flanges on ordinary railway car wheels.

The frame D is, at or near the center, provided with hangers *b b*, through which the rock-shaft E passes, said shaft being provided with arms *d d*, the outer ends of which are, by rods or pitmen H H, connected, one with the forward carriage, and one with the rear carriage.

To the shaft E should be attached the power or engine, in such a manner as to cause the shaft to rock forward and backward, but not to revolve.

In order to fully understand this machine and the motion produced, it must be borne in mind that, by attaching one end of each pitman H to each carriage, these pitmen are, in effect, fastened directly to the axles or centers of the wheels, since these carriages rest on, and are secured to, said axles. The power, then, in my machine is communicated to the centers of the wheels, and not to a crank, as is usual. Now, then, it must be evident that when the shaft E rocks back and forth it will cause the carriages G to vibrate back and forth likewise, and that the wheels will revolve alternately in opposite directions; but if the clutch or dog B be forced down on one side of each wheel in such a manner as to prevent the wheels from revolving in one direction, but at the same time leaving all free to revolve in the other or opposite direction, the vibration of the carriages will immediately cease, and the frame D will receive a continuous motion in one direction.

In order to steer the machine, the forward axle C is cut in two in the center, and the inner ends supported upon a plate, I, which is made fast to the bottom of the forward carriage. Each section of this axle is pivoted at point $x$, and to the inner ends of the sections is attached an endless chain, $h$, which, at one end, passes around a pulley, $i$, and at the other passes around the stem J. By turning this stem the axle-sections are made to assume any required position for turning.

The pitman H, above described, may be attached to a shaft or rod connecting the sides of the carriages, or otherwise, as may be desired.

In the hangers $d$, below the main shaft E, is supported another rocking shaft, K, having an arm, $m$, at each end, extending on both sides of the shaft. The upper ends of these arms are, by rods $n$, connected with the upper ends of the dogs in the rear wheels, while the lower ends of said arms are, by rods $n'$, connected to rods $p$, the outer ends of which are attached to the dogs in the front wheels, and the inner ends pivoted by a bolt to the divided axle. One of the arms, $m$, is further, by a rod, $s$, connected with a lever, L, pivoted at its lower end to the front carriage, and its upper end held in a segment, M, by means of which all the dogs are changed to reverse the motion of the carriage.

I claim—

1. In a traction-engine or road-wagon, two trucks supporting the wagon bed or frame, and connected by pitmen with a rocking shaft between them, in combination with suitable clutch devices attached to the main wheels, whereby the trucks are alternately moved, and the wagon bed or frame receives a continuous motion in one direction, substantially as set forth.

2. In a traction-engine or road-wagon, the wagon bed or frame sliding upon two separate and independent trucks, supported upon the axles of the main wheels, in combination with two pitmen of an ordinary engine applied to the axles or centers of the wheels, for the purposes herein set forth.

3. The combination of the main frame D, carriages G, with friction-wheels $a$, axles C, main wheels A, with dogs B, pitmen H, and rocking shaft E, with arms $d$, all substantially as and for the purposes herein set forth.

4. The combination, with the wheels A, of the dogs or clutches B, connecting-rods $n$ $n'$, rocking shaft K, with arms $m$, rods $s$, lever L, and notched segment M, all substantially as and for the purposes herein set forth.

In testimony that I claim the above I have hereunto subscribed my name in the presence of two witnesses.

ALPHEUS B. STICKNEY.

Witnesses:
E. W. RUFF,
L. R. COMMAN.